(12) United States Patent
Kato (10) Patent No.: US 6,556,714 B2
(45) Date of Patent: *Apr. 29, 2003

(54) SIGNAL PROCESSING APPARATUS AND METHOD

(75) Inventor: Motoki Kato, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,011

(22) Filed: Jan. 26, 1999

(65) Prior Publication Data

US 2003/0016757 A1 Jan. 23, 2003

(30) Foreign Application Priority Data

Jan. 28, 1998 (JP) .......................... 10-016089

(51) Int. Cl.$^7$ ............................... C06K 9/46
(52) U.S. Cl. ..................... 382/232; 382/233; 358/426.1
(58) Field of Search ................. 382/232, 233, 382/244, 246, 254, 253, 258, 250, 299; 348/14.11, 14.13; 358/426.1; 375/240.28, 240

(56) References Cited

U.S. PATENT DOCUMENTS

| | | | | |
|---|---|---|---|---|
| 5,473,380 A | * | 12/1995 | Tahara | 386/111 |
| 5,532,746 A | * | 7/1996 | Chang | 348/700 |
| 5,715,009 A | * | 2/1998 | Tahara et al. | 375/240.23 |
| 5,719,982 A | * | 2/1998 | Kawamura et al. | 386/126 |
| 6,285,716 B1 | * | 9/2001 | Knee et al. | 348/423.1 |

* cited by examiner

*Primary Examiner*—Bhavesh Mehta
*Assistant Examiner*—Sheela Chawan
(74) *Attorney, Agent, or Firm*—Frommer Lawrence & Haug LLP; William S. Frommer; Dennis M. Smid (57) ABSTRACT

A signal processor comprises a decoder 1 which decodes a bit stream S10 to provide an image signal S1 and a coding parameter S8, a switch SW1 to select a destination to which the image signal S1 from the decoder 1 is to be sent, a post-processing circuit 2 which post-processes the image signal from a selectable terminal B of the switch SW1 to provide an image signal S2, a pre-processing circuit 3 to preprocess an image signal S4, a switch SW2 to select either the image signal from the pre-processing circuit 3 or an image signal S3 from the switch SW1, and an encoder 4 which codes an image signal S5 and coding parameter to provide a bit stream.

9 Claims, 9 Drawing Sheets

SIGNAL PROCESSING APPARATUS AND METHOD

BACKGROUND OF THE INVENTION

1. Field of the Invention

The present invention relates to a signal processing apparatus and method in which a bit stream supplied as an input is decoded to an image signal and the image signal is provided as a bit stream again.

2. Description of Related Art

For video signal compression, MPEG (moving picture coding experts group) and MPEG-2 have been used more widely in combination with a redundancy reduction by an orthogonal transform such as motion compensation (MC), discrete cosine transform (DCT) or the like.

An audio data not compressed is compressed according to such an MPEG to be a coded image such as an intra-picture coded image (I picture), forward -predictive coded image (P picture) or bi-directional predictive coded image (B picture) for storage into a cumulative recording medium such as magneto-optic disc or the like or for transmission over a communications network.

In this MPEG technique, a bit stream is decoded to be a picture signal which will be transformed into a bit stream again. For transform from a movie film to a video film, four frames are subjected to a so-called 2:3 pulldown processing to produce five frames in order to transform 24 frames/sec on the movie film to 30 frames/sec on a TV/video film.

Figure 1:
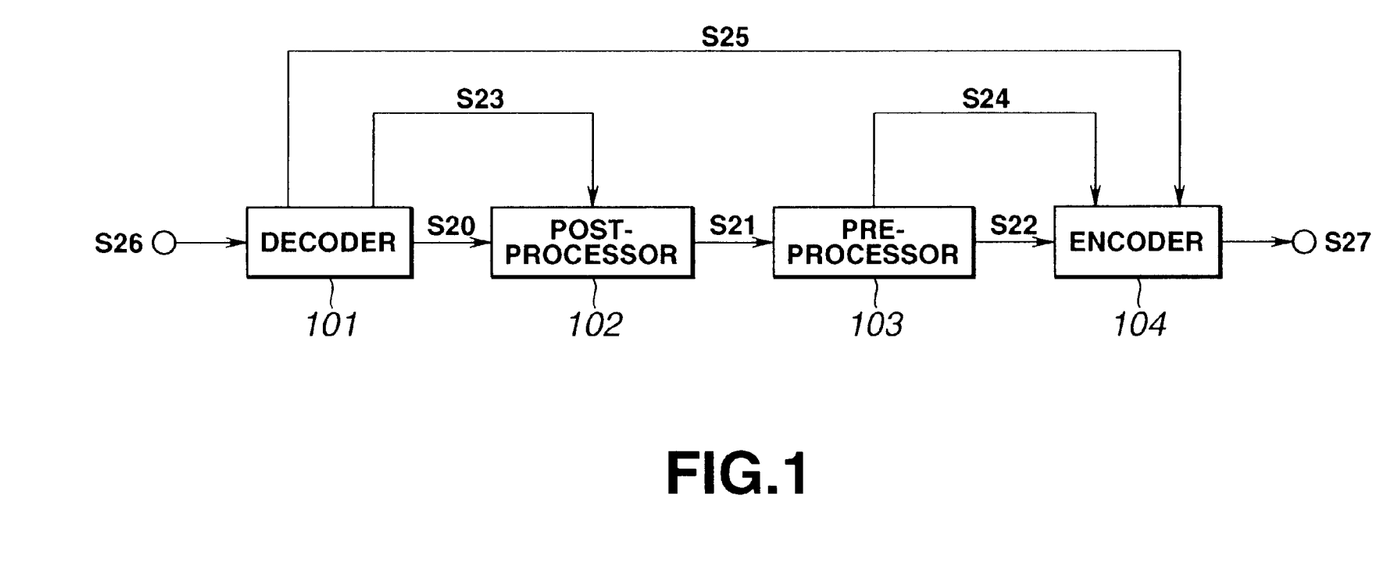
FIG. 1 is a schematic block diagram of a conventional signal processor.

FIG. 1 illustrates, in a schematic block form, a conventional signal processor in which a bit stream of a moving picture is decoded and the decoded moving picture is coded according to the MPEG-2 Video Compression Standard to output the bit stream.

As shown, the conventional signal processor includes a decoder 101 to decode an external input bit stream S26 to a picture signal, a post-processing circuit 102 to post-process the decoded picture signal, a pre-processing circuit 103 to pre-process the picture signal for coding, and an encoder 104 to code the picture signal from the pre-processing circuit 103.

The decoder 101 decodes the input bit stream S26 to provide a decoded picture S20. The decoder 101 also decodes a display control parameter S23 from the input bit stream S26 and supplies it to the post-processing circuit 102. The display control parameter S23 prescribed in the MPEG-2 Video Compression Standard is horizontal_size, vertical_size, frame rate, display_horizontal_size, display_vertical_size, aspect_ratio_information, progressive_frame, repeat_first_field, top_field_first, frame_centre_horizontal_offset, frame_centre_vertical_offset.

The post-processing circuit 102 processes the decoded picture S20 based on the display control parameter S23 to provide a post-processed image S21. More particularly, the post-processing circuit 102 effects 2:3 pulldown based on top_field_first, repeat_first_field, upsampling of chroma signal from 4:2:0 format to 4:2:2 format based on progressive_frame, and also clipping of a rectangular window from an image and switching to sampling in a display frame size, namely, upsampling or downsampling, based on horizontal_size, vertical_size, display_horizontal_size, display_vertical_size, aspect_ratio_information, frame_centre_horizontal_offset, frame_centre_vertical_offset.

The 4:2:0 format is a component format for coding of video signal, adopted in MP@ML (main profile/main level) of MPEG-2. The FIGS. 4, 2 and 0 indicate a sampling frequency ratio, that is, resolution ratio, between a brightness (Y) signal included in the horizontal line (scanning line) of a video signal and two chrominance signals (Cb and Cr). The figures in the 4:2:2 format also indicate such ratios.

The post-processed image S21 is supplied to the pre-processing circuit 103 in which the post-processed image S21 is subjected to inverse 3:2 pulldown, downsampling of chroma signal from the 4:2:2 format to 4:2:0 format, etc. to provide a pre-processed signal S22. Also the pre-processing circuit 103 provides a display control parameter S24 indicative of the content of the inverse processing from the pre-processed image S22 to post-processed image S21.

The encoder 104 codes the pre-processed image S22 and also codes the display control parameter S24 of the pre-processed image S22 as a header information of a bit stream of the coded pre-processed image S22 to provide a bit stream S27.

It is well known that for coding an image with a high quality when decoding an MPEG video bit stream and re-coding the decoded image according to MPEG for providing an bit stream, rendering a picture_coding_type being a coding parameter S25 for coding the image same as that of the original bit stream is effective. For this purpose, the coding parameter S25 is supplied from the decoder 101 to the encoder 104. The information carried by the coding parameter S25 is effected when the decoded image S20 corresponds one-to-one to the pre-processed image S22.

In some cases, however, the coding parameter S25 cannot effectively be used since the one-to-one correspondence between the decoded image S20 and pre-processed image S22 cannot be assured.

As the causes of the decoded image S20 and pre-processed image S22 not corresponding one-to-one to each other, the inverse 2:3 pulldown of the post-processed image S21 by the pre-processing circuit 103 is not any completely inverse one, that the post-processing circuit 102 has switched to sampling in the display frame size, etc.

Also, repeated upsampling of chroma signal in the post-processing circuit 102 and downsampling of chroma signal in the pre-processing circuit 103 will also cause the chroma signal to be deteriorated.

The external bit streams S26 include ones based on different signal standards. Images S20 decoded from such external bit streams S26 in the decoder 101 are different in number of pixels per picture and number of pictures per unit time. For transmission of such images, interfaces meeting the different signal standards have to be used and also hardware and software have to be used which meet such standards.

SUMMARY OF THE INVENTION

It is therefore an object of the present invention to overcome the above drawbacks of the prior art by providing a signal processing apparatus and method in which coding parameters can be effectively used to code, with a high quality, an image decoded from a bit stream coded from an image signal.

It is another object of the present invention to provide a signal processing apparatus and method, signal decoder and signal encoder in which for transmission of an image decoded from a bit stream coded from an image signal, an existing interface can be used even for images prepared according to different standards and coding parameters can be effectively used to code, with a high quality, an image decoded from a bit stream coded from an image signal.

The above object can be attained by providing a signal processing apparatus comprising, according to the present invention:

means for decoding a bit stream coded from an image signal to provide an image signal and a coding parameter;

a first switching means for selecting a destination to which the image signal from the decoding means is to be sent;

means for post-processing the image signal from a selectable terminal of the first switching means;

means for pre-processing the image signal;

a second switching means for selecting either the image signal from the pre-processing means or the image signal from the first switching means; and means for coding the image signal from the second switching means and the coding parameter from the decoding means.

The above object can also be attained by providing a signal processing method in which a signal processing apparatus including means for decoding a bit stream coded from an image signal to provide an image signal and a coding parameter; a first switching means for selecting a destination to which the image signal from the decoding means is to be sent; means for post-processing the image signal from a selectable terminal of the first switching means; means for pre-processing the image signal; a second switching means for selecting either the image signal from the pre-processing means or the image signal from the first switching means; and means for coding the image signal from the second switching means and the coding parameter from the decoding means, comprising, according to the present invention, the steps of:

decoding a bit stream to an image signal by the decoding means; and coding the image signal from the decoding step by the coding means.

The above object can also be attained by providing a signal processing apparatus and method in which, according to the present invention, a bit stream coded from an image signal is decoded to provide an image signal and a coding parameter; a dummy signal is inserted to convert the decoded image signal to a predetermined format, to thereby provide the image signal in the predetermined format; the image signal in the predetermined format including the dummy signal is transmitted; the dummy signal is removed from the transmitted image signal; and the image signal from which the dummy signal has been removed and the coding parameter are coded together.

The above object can also be attained by providing a signal decoder comprising, according to the present invention:

means for decoding a bit stream coded from an image signal to provide an image signal and a coding parameter; and means for inserting a dummy signal to convert the image signal from the decoding means to a predetermined format, to thereby provide the image signal in the predetermined format.

The above object can also be attained by providing a signal encoder comprising, according to the present invention:

means for receiving an image signal in which a dummy signal is inserted to convert an image signal decoded from a bit stream coded from an image signal to a predetermined format and removing the dummy signal from the image signal in the predetermined format including the dummy signal; and means for coding the image signal from which the dummy signal has been removed and a coding parameter obtained during the decoding to provide a bit stream.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 2:
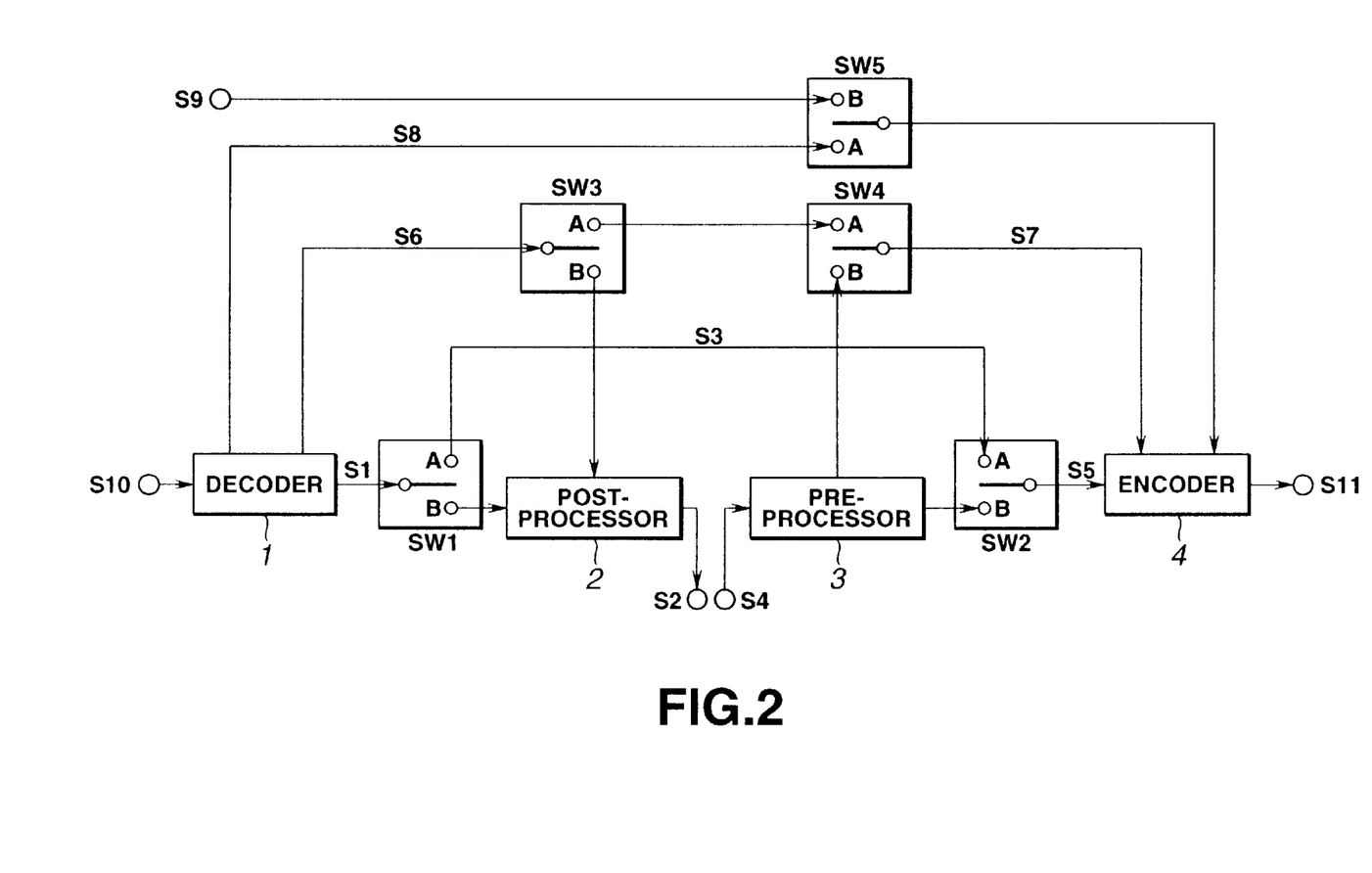
FIG. 2 is a schematic block diagram of a first embodiment of signal processor according to the present invention.

Referring now to FIG. 2, there is schematically illustrated in the block diagram the first embodiment of signal processor according to the present invention. The signal processor comprises a decoder 1 which decodes a bit stream S10 supplied from outside to provide an image signal S1 and display control parameter S6, and a first switch SW1 which is supplied with the image signal S1 from the decoder 1 and selects either a selectable terminal A for connection to a second switch SW2 or a selectable terminal B for connection to a post-processor 2.

The decoder 1 decodes the input bit stream S10 to provide an image signal S1 which is to be processed. The decoder 1 also decodes a display control parameter S6 and coding parameter S8 for the image signal S1. The following display control parameter S6 is prescribed in the MPEG-2 Video Compression Standard:

horizontal_size, vertical_size, frame_rate, display horizontal_size, display_vertical_size, aspect_ratio_information, progressive_frame, repeat_first_field, top_field_first, frame_centre_horizontal_offset, frame_centre_vertical_offset.

The coding parameter S8 includes the following:

Header information of sequence layer except for display control parameter, picture layer header parameter except for display control parameter, motion vector information (mb_type, frame_motion_type or field_motion_type, motion vector), dct_type, and quantum scale.

The signal processor further comprises a third switch SW3 which is supplied with the display control parameter S6 from the decoder 1 and selects either a selectable terminal A for connection to a fourth switch SW4 or a selectable terminal B for connection to the post-processing circuit 2. The post-processing circuit 2 is supplied with the image signal S1 via the first switch SW1 and the display control parameter S3 via the third switch SW3 and post-processes them to provide an image signal S2.

The post-processing circuit 2 processes the image signal S1 based on the display control parameter S6 supplied from the decoder 1 via the switch SW3 to provide the image signal S2 to outside. More particularly, the post-processing circuit 2 effect 2:3 pulldown based on top_field_first, repeat_first_field, upsampling of chroma signal from 4:2:0 format to 4:2:2 format based on progressive_frame, and clipping of rectangular window from an image and switching to sampling in display frame size, namely, upsampling or downsampling, based on horizontal_size, vertical_size, display_horizontal_size, display_vertical_size, aspect_ratio_information, frame_centre_horizontal_offset, frame_centre_vertical_offset.

The signal processor according to the present invention further comprises a pre-processing circuit 3 to pre-process an image signal S4 supplied from outside to provide a bit stream and display control parameter, and a second switch SW2 which selects either a selectable terminal A for connection to the selectable terminal A of the first switch SW1 or a selectable terminal B for connection to the pre-processing circuit 3 to supply an image signal S5 to an encoder 4.

The post-processing circuit 2 effects inverse 3:2 pulldown of the external image signal S4 and downsampling of chroma signal from 4:2:0 format to 4:2:2 format, etc. to provide an image signal to the switch SW2, and the pre-processing circuit 3 provide the switch SW4 with a display control parameter indicative of the content of the inverse processing of the image signal S4.

The fourth switch SW4 of the signal processor according to the present invention selects either a selectable terminal A for connection to the selectable terminal A of the third switch SW3 or a selectable terminal B at which the display control parameter from the pre-processing circuit 2 is supplied to provide the encoder 4 with a display control parameter S7, and the encoder 4 encodes an image signal S5 supplied from the pre-processing circuit 3 via the second switch SW2 and a display control parameter S7 supplied via the fourth switch SW4.

The encoder 4 codes the image signal S5 supplied from either the decoder 1 or pre-processing circuit 3 via the switch SW1 or SW2 and also the display control parameter S7 as header information of the image signal S5 to provide a bit stream S11.

The signal processor also comprises a fifth switch SW5 which selects either a coded parameter S8 supplied to the selectable terminal A from the decoder 1 or coded parameter S9 supplied from outside and provides it to the encoder 4.

As having previously been mentioned, it is well known that for coding an image with a high quality when decoding an MPEG video bit stream and re-coding the decoded image according to MPEG for providing an bit stream, rendering a picture_coding_type for coding the image same as that of the original bit stream is effective. For this purpose, a coding parameter S8 is supplied to the encoder 4 from the decoder 1 via the switch SW5. Also, an external coding parameter S9 is supplied to the encoder 4 via the switch SW5 as the case may be.

When decoding a bit stream S110 and re-coding the decoded moving picture to provide a bit stream S11, the switches SW1, SW2, SW3, SW4 and SW5 are placed at the position A.

Namely, for decoding a bit stream and re-coding the decoded moving picture according MPEG, the coding parameter S8 shown in FIG. 2 is supplied from the decoder 1 to the encoder 4. Based on the supplied coding parameter, the encoder 4 will code the image signal S5 to provide a bit stream.

Normally, for decoding the bit stream S10 and providing the decoded image signal S2, the switches SW1 and SW3 are placed at their respective positions B.

Normally, for coding the image signal S4 to provide a bit stream S11, the switches SW2, SW4 and SW5 are placed at their respective positions B.

For decoding a bit stream and re-coding the decoded bit stream to provide the re-coded bit stream, the decoder 1, post-processor 2, pre-processor 3 and encoder 4 are connected in line to supply a coding parameter extracted from an MPEG video bit stream to the encoder 4 which will code the image based on the supplied coding parameter.

Next, the second embodiment of signal processor according to the present invention will be described with reference to FIG. 3. As shown, the signal processor comprises a signal decoder 511 and signal encoder 512. The signal decoder 511 comprises a decoder 51 to decode an external bit stream S510 to provide an image signal S51 and display control parameter S56, and a first switch SW51 which is supplied with the image signal S51 from the decoder 51 and selects either a selectable terminal B for connection to a dummy signal insertion circuit 57 or post-processing circuit 52.

The decoder 51 decodes the input bit stream S510 to provide the image signal S51 to be processed. The decoder 51 also decodes the display control parameter S56 and coding parameter S58 for the image signal S51 from the bit stream S510. The display control parameter S56 is prescribed in the MPEG-2 Video Compression Standard. Since it is similar to the display control parameter S5 having been described with reference to FIG. 2, it will not be described any longer.

The coding parameter S58 is similar to the coding parameter S8 having been discussed with reference to FIG. 2. So it will not be described any further.

Figure 3:
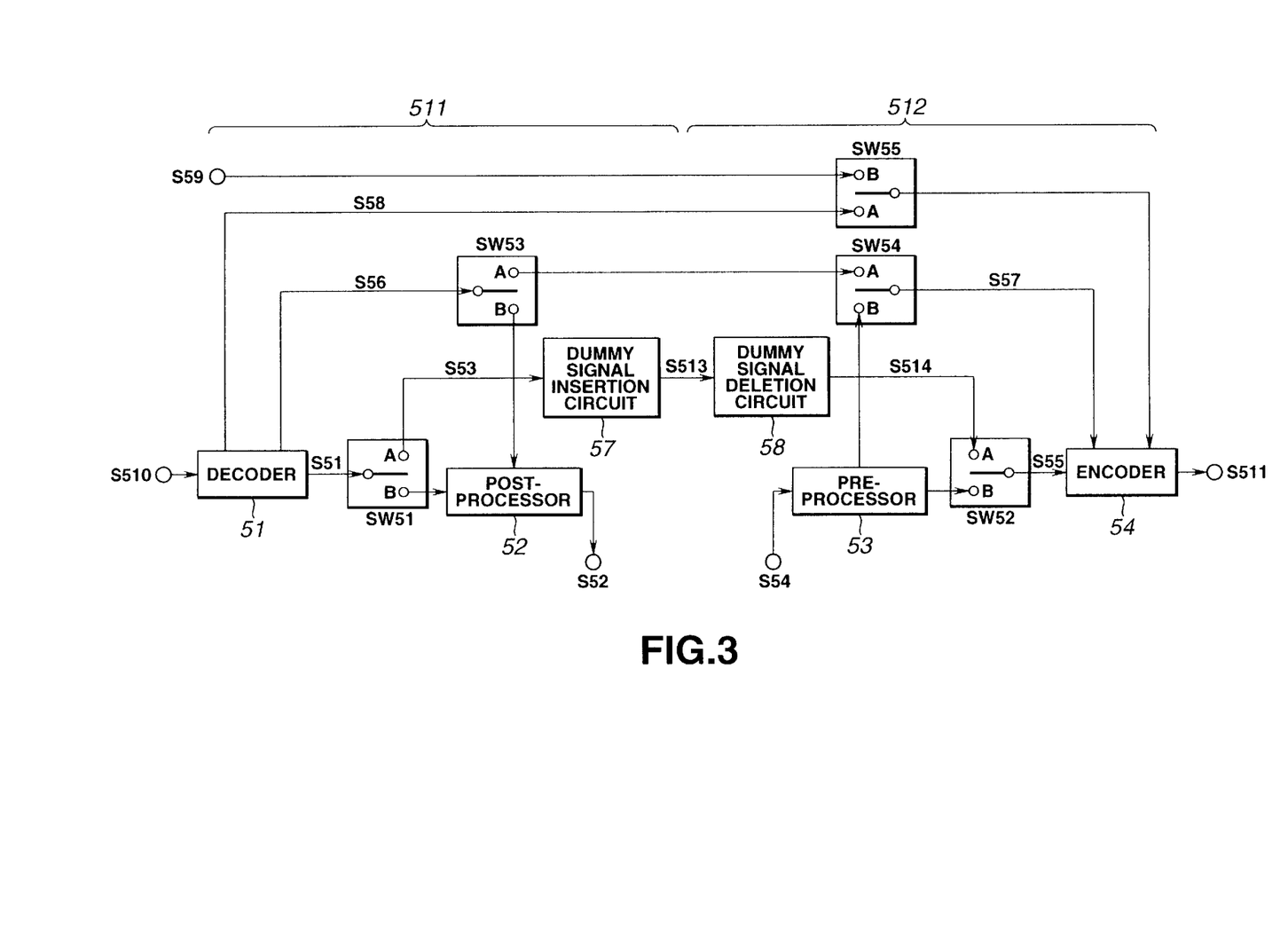
FIG. 3 is a schematic block diagram of a second embodiment of signal processor according to the present invention.

The signal encoder 511 of the signal processor shown in FIG. 3 comprises a third switch SW53 which is supplied with a display control parameter S56 from the decoder 51 and directs the display control parameter S56 to either a selectable terminal A for connection to the dummy signal insertion circuit 57 (also a selectable terminal A for connection to a fourth switch SW54) or a selectable terminal B for connection to the post-processing circuit 52, and a post-processing circuit 52 which is supplied with the image signal S51 from the decoder 51 via a first switch SW51 and the display control parameter S56 via the third switch SW53 and post-processes the image signal S51 and display control parameter S56 to provide an image signal S2 to outside.

The post-processing circuit 52 processes the image signal S51 based on the display control parameter S56 supplied from the decoder 51 via the switch SW53 to provide an image signal S2. More particularly, the post-processing circuit 52 effects 2:3 pulldown based on top_field_first, repeat_first_field, chroma upsampling from 4:2:2 format to 4:2:0 format based on progressive_frame, and clipping of rectangular window from the image and switching to sampling in display frame size, namely, upsampling or downsampling, based on horizontal_size, vertical_size, display_horizontal_size, display_vertical_size, aspect_ratio_information, frame_centre_horizontal_offset, frame_centre_vertical_offset The dummy signal insertion circuit 57 inserts a dummy signal to convert the decoded image signal to a predetermined format and provides an image in the predetermined format. For example, when the coded bit stream is MP@ML of MPEG-2, the predetermined format is CCIR (ITU-R) Rec. 601 format (4:2:2 component digital).

As shown in FIG. 3, the signal encoder 512 comprises a dummy signal removing or deletion circuit 58 to remove a dummy signal from an image signal in which the dummy signal is inserted, a pre-processing circuit 53 to pre-process an image signal S54 supplied from outside to provide a bit stream and display control parameter, and a second switch SW52 to select either a selectable terminal A at which the output image S514 from the dummy signal deletion circuit 58 is supplied or a selectable terminal B for connection to the pre-processing circuit 53 to provide an image signal S55 to an encoder 54.

The pre-processing circuit 53 effects inverse 3:2 pulldown and chroma signal downsampling from 4:2:2 format to 4:2:0 format of the external image signal S54 to provide the processed image signal to the switch SW52. Also, the pre-processing circuit 53 provides the switch SW54 with the display control parameter indicative of the content of the inverse pulldown of the image signal S54.

The dummy signal deletion circuit 58 removes the dummy signal from an image signal S513 in the predetermined format supplied from the dummy signal insertion circuit 57 and including yet the dummy signal to provide an image signal S514. The image signals S53 and S514 are a same signal.

In the signal encoder 512 of the signal processor, the fourth switch SW54 selects either a selectable terminal A for connection to the selectable terminal A of the third switch SW53 or a selectable terminal B at which the display control parameter from the pre-processing circuit 53 is supplied to provide the encoder 54 with a display control parameter S57, and the encoder 54 codes the image signal S55 supplied from the pre-processing circuit 53 via the second switch SW52 and display control parameter S57 supplied via the fourth switch SW54.

The encoder 54 codes the image signal S55 supplied from either the dummy signal deletion circuit 58 or pre-processing circuit 53 via the switch SW52, and codes the display control parameter S57 as header information of the image signal S55 to provide a bit stream S511.

The signal encoder 512 in the signal processor shown in FIG. 3 further comprises a fifth switch SW55 which selects either a coding parameter S58 supplied at the selectable terminal A from the decoder 51 or a coding parameter S59 supplied from outside to provide the selected parameter to the encoder 54.

The encoder 54 is supplied with the coding parameter S58 from the decoder 51 via the switch SW55. Also it is also supplied with an external coding parameter S59 via the switch SW55.

For decoding the bit stream S510 and re-coding the decoded moving picture to provide a bit stream S511, the switches SW51, SW52, SW53, SW54 and SW55 are placed at their respective positions A.

More particularly, for decoding the bit stream and re-coding the decoded moving picture according to MPEG, the coding parameter S58 shown in FIG. 3 is supplied from the decoder 51 to the encoder 54. The encoder 54 codes the image signal S55 based on the supplied coding parameter to provide a bit stream.

Normally, for decoding the bit stream S510 and providing the decoded image signal S52, the switches SW51 and SW53 are placed at their respective positions B.

Normally, for coding the image signal S54 to provide a bit stream S511, the switches SW52, SW54 and SW55 are placed at their respective positions B.

For decoding a bit stream and re-coding the decoded bit stream to provide the re-coded bit stream, the decoder 51, post-processor 52, pre-processor 53 and encoder 54 are connected in line to supply a coding parameter extracted from an MPEG video bit stream to the encoder 54 which will code the image based on the supplied coding parameter.

The dummy signal insertion circuit 57 inserts a dummy signal in the decoded image S53 in a predetermined manner to provide an image S513 in the CCIR (ITU-R) Rec. 601 format. The dummy signal removing or deletion circuit 58 removes the dummy signal from the image S513 under a predetermined promise to restore the image in which the dummy signal has not yet been inserted by the dummy signal insertion circuit 57.

The dummy signal insertion and removal by the circuits 57 and 58, respectively, will be discussed herebelow in further detail with reference to FIGS. 4 to 6.

Figure 4A:
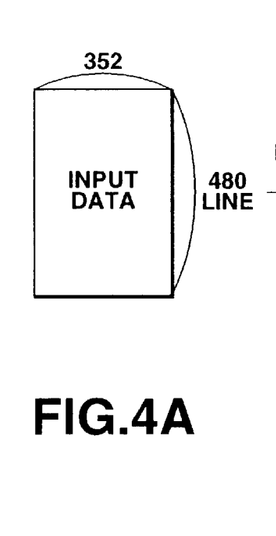
FIG. 4 is an explanatory drawing of a decoded image smaller in size than 720 pixels by 480 lines.
Figure 4B:
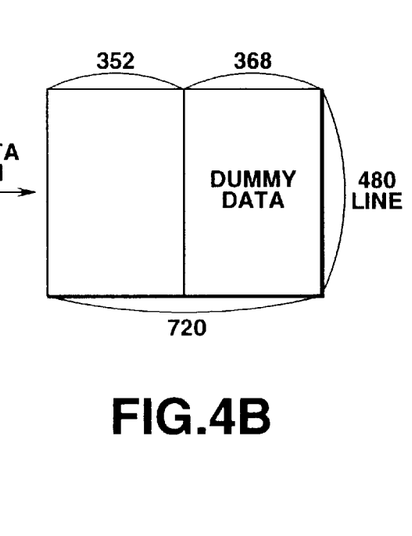
Figure 4C:
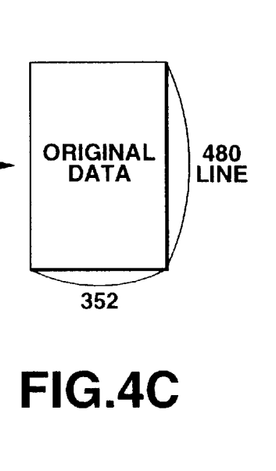

FIG. 4 shows a decoded image S53 smaller in size than 720 pixels by 480 lines.

FIG. 5 shows 2:3 pulldown of the decoded image S53. FIG. 6 shows upsampling of the decoded image S53 in 4:2:0 format to 4:2:2 format.

By inserting a dummy signal to fix an image signal S513 in a predetermined format, the image signal S513 can easily be transmitted.

More particularly, an input image having 352 pixels in each of 480 lines is supplied to the dummy signal insertion circuit 57 as shown in FIG. 4(A), and a dummy data of 368 pixels in each of 480 lines is added to the image signal to form an image of 720 pixels in each of 480 lines as shown in FIG. 4(B). This image conforms to the CCIR (ITU-R) Rec. 601 format standard. Therefore, the image signal can be transmitted through an existing interface of a so-called SDI (serial digital interface). Thereby, the decoded image can be transmitted without any hardware and software for an interface corresponding to the image format of, for example, 352 pixels by 480 lines. In the signal encoder 512, the transmitted image of 720 pixels by 480 lines is passed to the dummy signal deletion circuit 58 where the dummy signal of 368 pixels by 480 lines is removed to provide the original image of 352 pixels by 480 lines.

FIG. 5 shows 2:3 pulldown of the decoded image S53. FIG. 5(A) shows an picture on a movie film, etc. composed originally of 24 frames/sec, showing the images FA, FB, FC, FD, . . . For 2:3 pulldown of this picture of 24 frames/sec to a picture of NTSC format of 30 frames/sec (60 fields/sec), a top__field__first flag in FIG. 5(B) and a repeat__field__first flag in FIG. 5(C) are correlated to each other in each image (frame) in this picture signal. The top__field__first flag has a meaning that each frame of an original picture of 24 frames/sec is allocated from the top field of a picture of 30 frames/sec (60 fields/sec), while the repeat field__first flag means that by repeating a first field, one original frame is allocated for three fields. In the dummy signal insertion circuit 57 of the signal decoder 511 in FIG. 3, a dummy data indicated with "x" is inserted in the place of a field to be repeated to convert the image to an image data in the NTSC format. The image data thus obtained can be transmitted via an existing interface of so-called SDI or similar. Fields a1, a2, etc. in FIG. 5(D) indicate original frames FA, etc. in FIG. 5(A) allocated to two fields. In the signal encoder 512 in FIG. 3, the dummy signal is removed by the dummy signal deletion circuit 58 to provide the original image of 24 frames/sec (or an image of 2 fields at minimum).

Figure 6A:
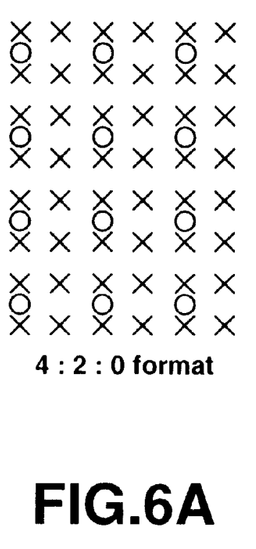
FIG. 6 is an explanatory drawing of upsampling of decoded image in 4:2:0 format to 4:2:2 format.
Figure 6B:
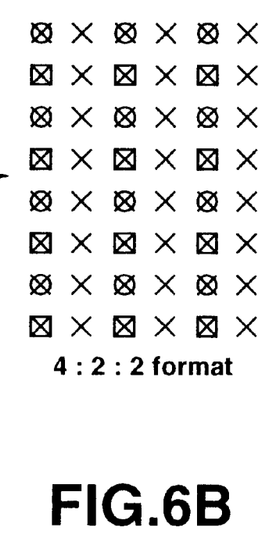
Figure 6C:
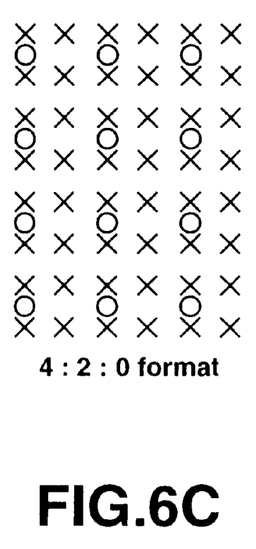

FIG. 6 shows upsampling of a decoded image S53 in 4:2:0 format to 4:2:2 format in the dummy signal insertion circuit 57. FIG. 6(A) shows a two-dimensional pixel arrangement of brightness sample "x" and chrominance sample "○" in the 4:2:0 format. At the position of the chrominance sample "○", two kinds of chrominance Cr and Cb are provided. The dummy signal insertion circuit 57 inserts a dummy data in such a decoded image S53 for conversion to an image signal in the 4:2:2 format as shown in FIG. 6(B). The mark "□" in FIG. 6(B) indicates the dummy data.

Assume that the brightness component pixel in the image signal in the 4:2:2 format is Y and the chrominance component pixels are Cr and Cb. Each pixel data in the transmission format consists of 720 brightness Y's per line and 360 chrominance Cr's and Cb's arranged like CbYCrYCbY-CrYCbYCrY . . . Data in an image signal in which the dummy data "□" is inserted is arranged like CbYCrY□Y□YCbYCrY□Y□Y . . . The image signal in the 4:2:2 format in the dummy signal is inserted can be transmitted through an existing interface of so-called SDI.

Figure 5A:
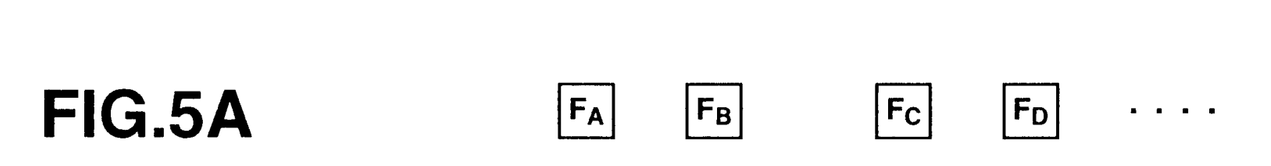
FIG. 5 is an explanatory drawing of 2:3 pulldown of a decoded image.
Figure 5B:
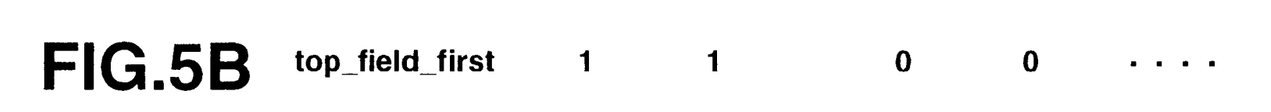
Figure 5C:
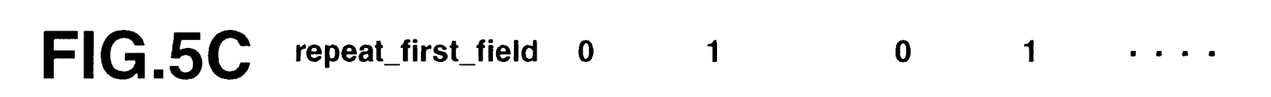
Figure 5D:
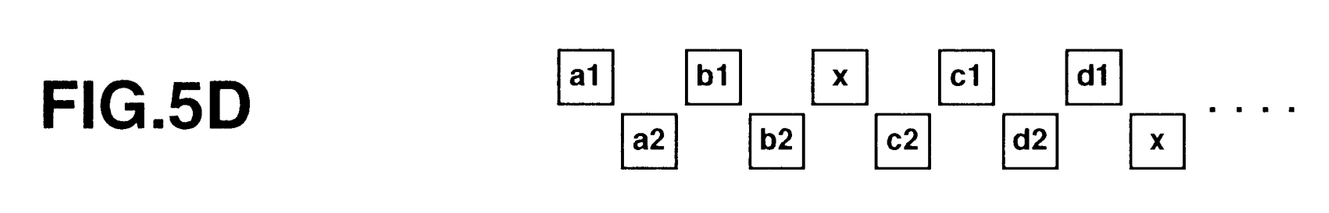
Figure 5E:
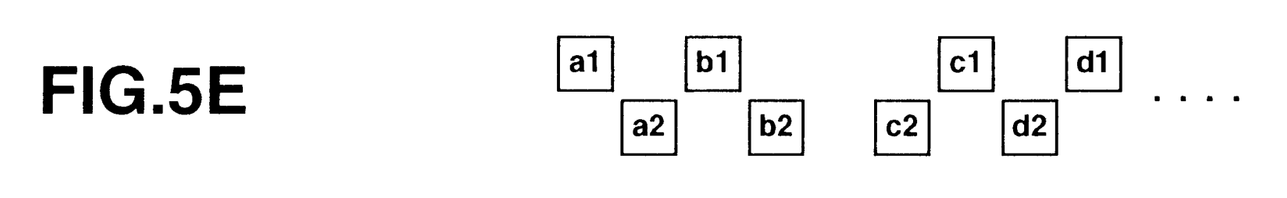

In the signal encoder 512 in FIG. 3, the dummy signal is removed from the image signal in the 4:2:2 format in which the dummy data is inserted to provide an image signal in the 4:2:0 format as in FIG. 5(C).

Next, the decoder 1 and encoder 4 will be discussed herebelow. The decoder 51 and encoder 54 are similar to the decoder 1 and encoder 4, and so they will not be described any further.

Figure 7:
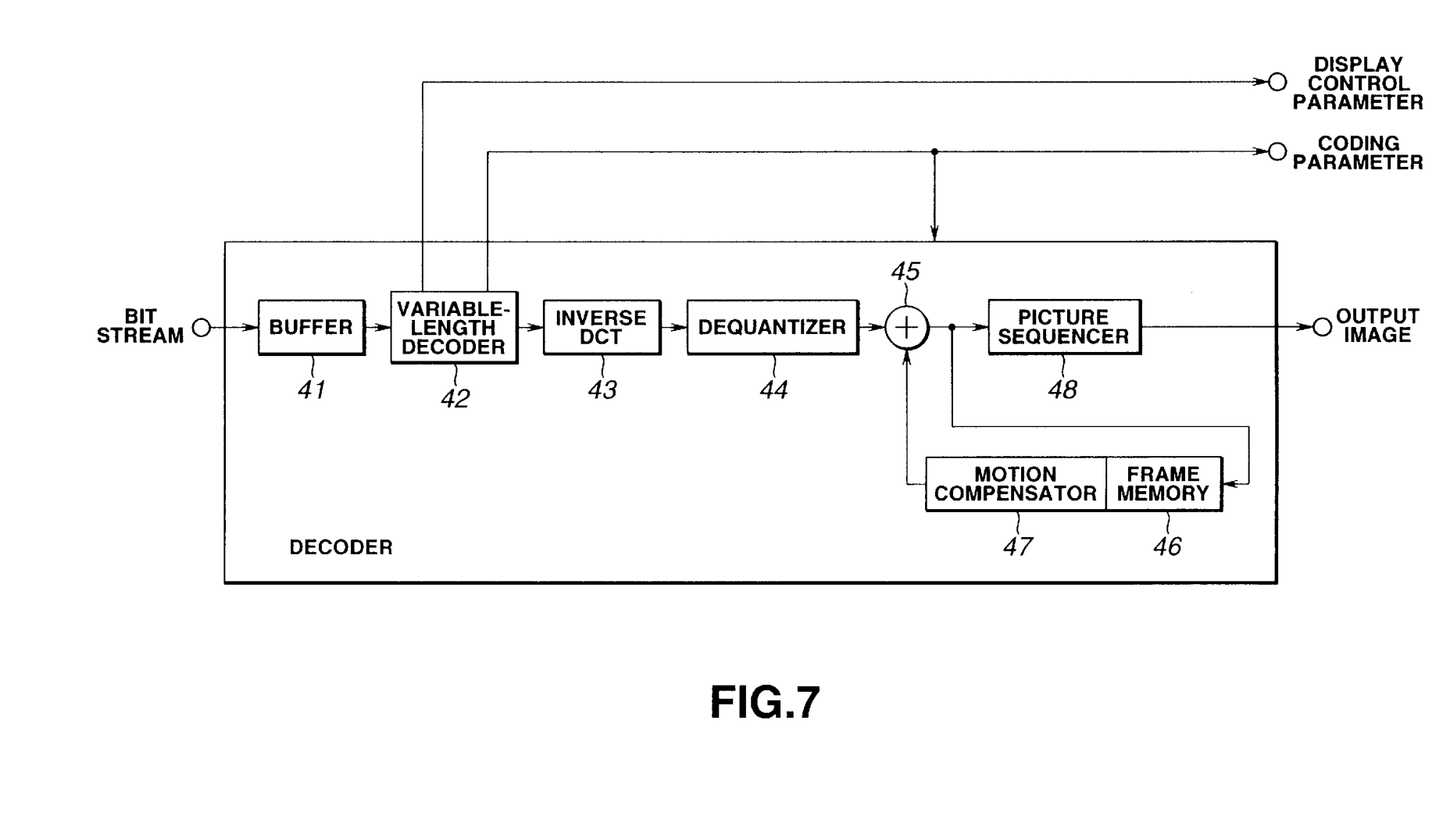
FIG. 7 is a schematic block diagram of a decoder in the signal processor.

FIG. 7 is a schematic block diagram of a decoder in the signal processor. In the decoder 1, an input MPEG bit stream is stored in a buffer 41, the bit stream from the buffer 41 is variable-length decoded by a variable-length decoding circuit 42 to provide a display control parameter and coding parameter. There is provided an inverse DCT circuit 43 which processes the output from the variable-length decoding circuit 42 by inverse discrete cosine transform (DCT). The output from the inverse DCT circuit 43 is dequantized by a dequantization circuit 44.

The output from the dequantization circuit 44 is supplied to an addition circuit 45 where it is added to a signal provided through a frame memory 46 to store images for one frame and a motion compensation circuit 47 which compensates a motion of a moving picture. The output from the addition circuit 45 is supplied to the frame memory 46 and a picture sequencing circuit 48. The output from the picture sequencing circuit 48 is an output image from the decoder 1.

Figure 8:
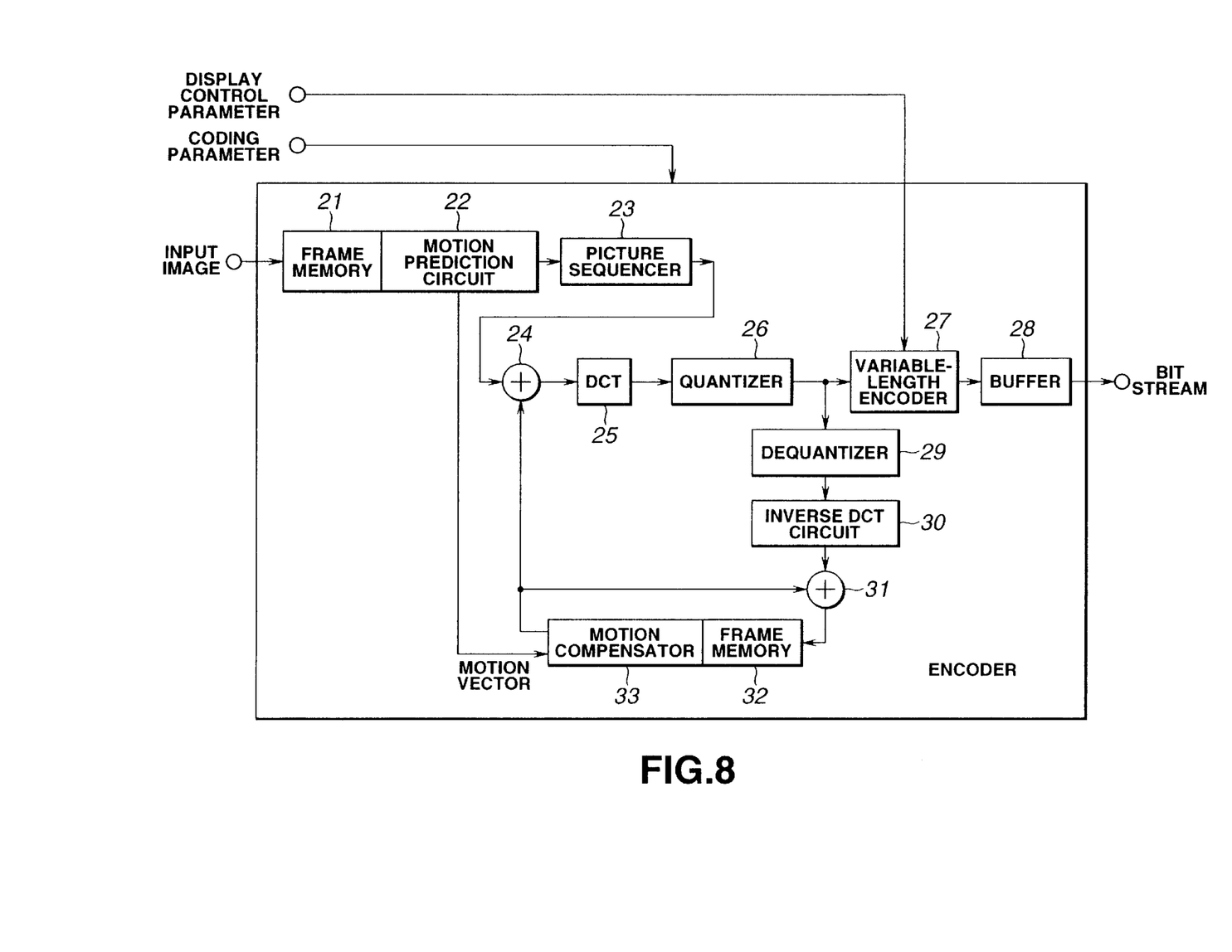
FIG. 8 is a schematic block diagram of an encoder in the signal processor.

FIG. 8 shows the encoder 4 in the signal processor. As shown, an input image is supplied to the frame memory 21 which stores images for one frame. The output from the frame memory 21 is supplied to a motion prediction circuit 22 where a motion of the image is predicted. The output from the motion prediction circuit 22 is supplied to a picture sequencing circuit 23 and also to a motion compensation circuit 33.

The output from the picture sequencing circuit 23 is supplied to an addition circuit 24 where the output from the motion compensation circuit 33 is subtracted from the output of the picture sequencing circuit 23 to provide the subtraction result to a DCT circuit 25.

The DCT circuit 25 is followed by a quantization circuit 26. The output from this quantization circuit 26 is provided, on the one hand, as output from the encoder 4 via a variable-length encoding circuit 27 and a data buffer, and on the other hand, passed to an addition circuit 31 via a dequantization circuit 29 and inverse DCT circuit 30. In the addition circuit 31, the outputs from the inverse DCT circuit 30 and motion compensation circuit 33 are added together to provide the addition result to a frame memory 32.

Figure 9:
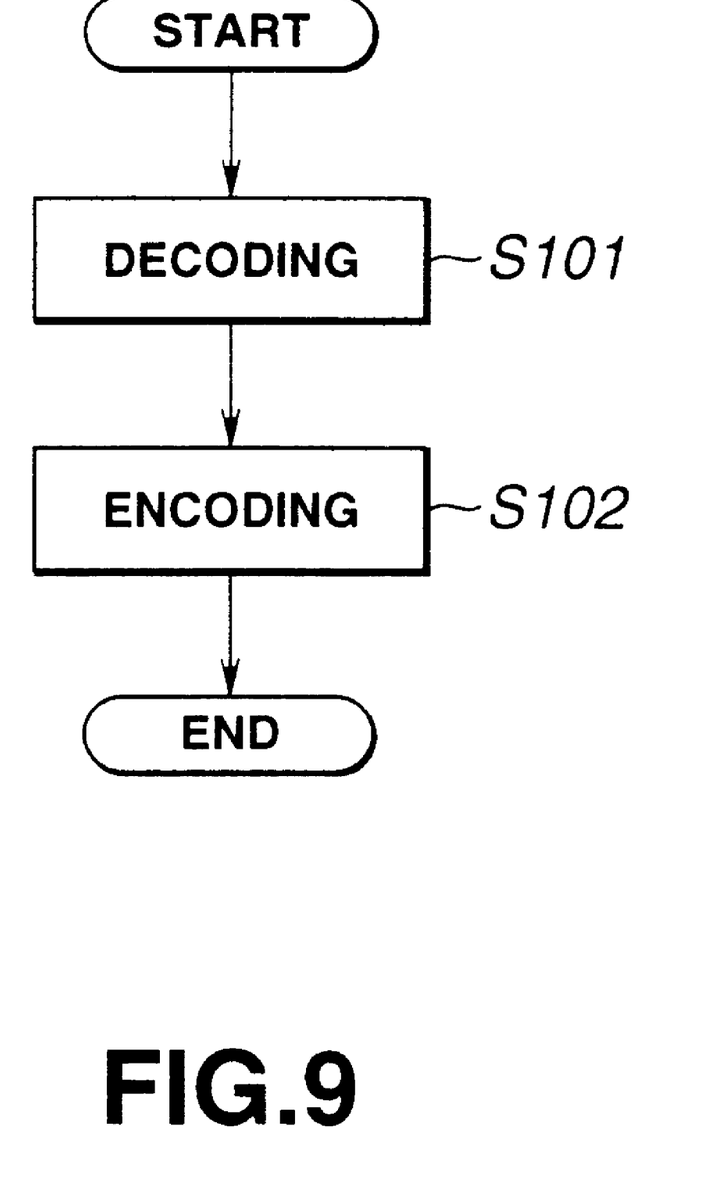
FIG. 9 is a flow chart of signal processing operations.

Next, a series of signal processing operations will be described with reference to FIG. 9.

For this signal processing, a signal processor is used which comprises, as shown in FIGS. 2 and 5, a decoder 1 (51) to decode a bit stream coded from an image signal to provide an image signal and coding parameter, a switch SW1 (SW51) to select a destination to which the image signal output of the decoder 1 (51) is to be sent, a post-processing circuit 2 (52) to post-process the image signal from a selectable terminal A of the switch SW1 (SW51), a pre-processing circuit 3 (53) to pre-process the image signal, a switch SW2 (SW52) to select either the image signal from the pre-processing circuit 3 (53) or a one from the switch SW1 (SW51), and an encoder 4 (54) to code the image signal from the switch SW2 (SW52) or the coding parameter from the decoder 1 (51) to provide a bit stream.

At a first step S101, a bit stream S10 (S510) supplied to the decoder 1 (51) is decoded to provide an image signal.

At a next step S102, an image signal supplied from the decoder 1 (51) to the encoder 4 (54) via the above-mentioned direct input path is coded to provide a bit stream S11 (S511).

As having been described in the foregoing, the signal processing apparatus according to the present invention can code an image with a high quality since the decoder, post-processor, pre-processor and encoder are connected in line and the image is coded based on an input coding parameter.

The signal processing method according to the present invention permits to code an image with a high quality since the image is processed through a straight sequence of decoding, post-processing, pre-processing and coding and it is coded based on an input coding parameter.

What is claimed is:

1. A signal processing apparatus, comprising:
   switch means having a first switch and a second switch, in which a first output terminal of said first switch is coupled to a first input terminal of said second switch;
   means for decoding a bit stream coded from an image signal to obtain a decoded image signal and supplying the same to an input terminal of said first switch;
   means, coupled to a second output terminal of said first switch, for receiving the decoded image signal supplied from the decoding means and for post-processing the same in a predetermined manner;
   means for coding an image signal, in which the coding means is coupled to an output terminal of said second switch; and
   means for pre-processing an input image signal in a predetermined manner and supplying the pre-processed image signal to a second input terminal of said second switch;
   whereby said first and second switches are controlled so as to supply the decoded image signal provided from the decoding means to the coding means without being supplied to the pre-processing means and post processing means when re-coding the decoded image signal.

2. The signal processing apparatus as set forth in claim 1, wherein the post-processing means comprises means for pulldown of the decoded image signal.

3. The signal processing apparatus as set forth in claim 2, wherein the operations in the post-processing means include at least one of pulldown, chroma signal upsampling, clipping of rectangular window from image and switching to sample in display frame size and the operations in the pre-processing means include at least one of inverse pulldown of image signal and chroma signal downsampling.

4. The signal processing apparatus as set forth in claim 1, wherein the post-processing means comprises means for chroma signal upsampling of the decoded image signal.

5. The signal processing apparatus as set forth in claim 1, wherein the post-processing means comprises means for rectangular window clipping of the decoded image signal.

6. The signal processing apparatus as set forth in claim 1, wherein the post-processing means comprises means for switching of the decoded image signal to sampling in a display frame size.

7. A signal processing apparatus, comprising:

switch means having a first switch and a second switch;

means for decoding a bit stream coded from an image signal to obtain a decoded image signal and supplying the same to an input terminal of said first switch;

means, coupled to a first output terminal of said first switch, for receiving the decoded image signal supplied from the decoding means and for post-processing the same in a predetermined manner;

means for coding an image signal, in which the coding means is coupled to an output terminal of said second switch;

means for pre-processing an input image signal in a predetermined manner and supplying the pre-processed image signal to a first input terminal of said second switch;

converting means, coupled to a second output terminal of said first switch, for receiving the decoded image signal supplied from the decoding means and for inserting a dummy signal into the received decoded image signal to convert the received decoded image signal to a predetermined signal format; and inverse converting means for removing the dummy signal from the image signal provided from the converting means to restore the image signal to the original signal format and for supplying the same to a second input terminal of said second switch;

whereby said first and second switches are controlled so as to supply the decoded image signal provided from the decoding means to the coding means via the converting means and inverse converting means without being supplied to the pre-processing means and post-processing means when re-coding the decoded image signal.

8. The signal processing apparatus as set forth in claim 7, wherein:

the decoding means provides a display control parameter and a coding parameter along with the image signal;

the post-processing means is supplied with the image signal and display control parameter from the decoding means;

the pre-processing means provides an image signal and display control parameter;

the coding means is supplied with the display control parameter from the preprocessing means along with the image signal and one of said coding parameter supplied from said means for decoding and a user supplied coding parameter; and when re-coding the decoded image signal, the display control parameter from the decoding means is supplied to the coding means.

9. A signal processing method, comprising the steps of:

decoding a bit stream coded from an image signal to obtain a decoded image signal by use of a decoding means and supplying the same to an input terminal of a first switch;

receiving the decoded image signal supplied from the decoding means by way of a first output terminal of said first switch and post-processing the same in a predetermined manner by use of a post-processing means;

coding an image signal by use of a coding means which is coupled to an output terminal of said second switch;

pre-processing an input image signal in a predetermined manner by use of a pre-processing means and supplying the pre-processed image signal to a first input terminal of a second switch;

receiving the decoded image signal supplied from the decoding means by way of a second output terminal of said first switch and inserting a dummy signal into the received decoded image signal to convert the received decoded image signal to a predetermined signal format by use of a converting means; and removing the dummy signal from the image signal provided from the converting means to restore the image signal to the original signal format by use of an inverse converting means and supplying the same to a second input terminal of said second switch;

whereby said first and second switches are controlled so as to supply the decoded image signal provided from the decoding means to the coding means via the converting means and inverse converting means without being supplied to the pre-processing means and post-processing means when re-coding the decoded image signal.

* * * * *